United States Patent
Matsuoka (10) Patent No.: US 12,296,690 B2
(45) Date of Patent: May 13, 2025

(54) DIAGNOSTIC SYSTEM FOR SECONDARY BATTERY, DIAGNOSTIC METHOD FOR SECONDARY BATTERY, AND VEHICLE

(71) Applicant: TOYOTA JIDOSHA KABUSHIKI KAISHA, Toyota Aichi-ken (JP)

(72) Inventor: Shohei Matsuoka, Toyota Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 386 days.

(21) Appl. No.: 18/081,896

(22) Filed: Dec. 15, 2022

(65) Prior Publication Data

US 2023/0226916 A1 Jul. 20, 2023

(30) Foreign Application Priority Data

Jan. 18, 2022 (JP) ................. 2022-005559

(51) Int. Cl.
*B60L 58/10* (2019.01)
*B60L 3/00* (2019.01)
*B60L 58/18* (2019.01)
*G01B 7/16* (2006.01)
*H01M 10/42* (2006.01)

(52) U.S. Cl.
CPC ............ *B60L 3/0046* (2013.01); *B60L 58/18* (2019.02); *H01M 10/425* (2013.01); *G01B 7/18* (2013.01)

(58) Field of Classification Search
CPC ........ B60L 3/0046; B60L 58/18; B60L 50/64; B60L 2240/549; B60L 2250/10; B60L 3/12; B60L 58/16; B60L 58/10; B60L 2240/54; H01M 10/425; H01M 10/42; H01M 10/44; H01M 2010/4271; H01M 10/48; H01M 2220/20; H01M 10/4207; H01M 10/4221; G01B 7/18; Y02E 60/10
See application file for complete search history.

(56) References Cited

U.S. PATENT DOCUMENTS

| | | | | |
|---|---|---|---|---|
| 2,621,231 A | * | 12/1952 | Medlar | G01R 31/385 320/132 |
| 5,260,638 A | * | 11/1993 | Hirahara | H01M 10/48 320/147 |
| 2002/0085397 A1 | * | 7/2002 | Suzui | H02M 7/48 363/37 |
| 2014/0091783 A1 | * | 4/2014 | Cotton | G01R 31/40 324/76.39 |

FOREIGN PATENT DOCUMENTS

| | | |
|---|---|---|
| JP | 2012-174367 A | 9/2012 |
| JP | 2012-174487 A | 9/2012 |
| JP | 2020-114121 A | 7/2020 |
| JP | 2021-052463 A | 4/2021 |
| JP | 2022-076670 A | 5/2022 |
| JP | 2022-076672 A | 5/2022 |

* cited by examiner

Primary Examiner — Daniel M. Robert
(74) Attorney, Agent, or Firm — Dinsmore & Shohl LLP (57) ABSTRACT

A diagnostic system for a secondary battery includes a ripple current circuit configured to apply a ripple current of a predetermined frequency to the secondary battery, a strain gauge configured to acquire strain of the secondary battery in association with the application of the ripple current of the predetermined frequency, and an electronic control unit configured to diagnose whether or not the secondary battery is a regular product.

9 Claims, 6 Drawing Sheets

DIAGNOSTIC SYSTEM FOR SECONDARY BATTERY, DIAGNOSTIC METHOD FOR SECONDARY BATTERY, AND VEHICLE

CROSS-REFERENCE TO RELATED APPLICATION

This application claims priority to Japanese Patent Application No. 2022-005559 filed on Jan. 18, 2022, incorporated herein by reference in its entirety.

BACKGROUND

1. Technical Field

The present disclosure relates to a diagnostic system for a secondary battery and a diagnostic method for a secondary battery, and particularly relates to a system and a diagnostic method for diagnosing whether or not a secondary battery is a regular product, and a vehicle mounted with the diagnostic system.

2. Description of Related Art

In recent years, a vehicle mounted with a battery pack, such as a hybrid electric vehicle and a battery electric vehicle, has become widespread. For an in-vehicle battery pack, a counterfeit product manufactured by a manufacturer other than a manufacturer of a regular product may be distributed. Modification may be made to the regular product. These non-regular products (counterfeit or third-party products) may use an inferior secondary battery or may lack performance needed by the vehicle. Therefore, a technique for diagnosing whether a battery pack (secondary battery) is a regular product or a non-regular product has been proposed.

For example, Japanese Unexamined Patent Application Publication No. 2012-174487 (JP 2012-174487 A) discloses a battery pack. When a difference between a weight of a battery measured in an initial state (first weight) and a current weight of the battery (second weight) is larger than a threshold value, a controller in the battery pack diagnoses that the battery is not a regular product.

SUMMARY

In JP 2012-174487 A, whether or not a secondary battery is a regular product is diagnosed based on a weight of the secondary battery. Therefore, when a secondary battery having an equivalent weight but different characteristics (which may include a shape, a structure, a material, or the like) other than the weight is used as an object, appropriate diagnosis may not be possible.

The present disclosure is to diagnose whether or not a secondary battery is a regular product even when a regular product and a non-regular product are equal in weight.

A diagnostic system for a secondary battery according to a first aspect of the present disclosure includes a ripple current circuit, a strain gauge, and an electronic control unit. The ripple current circuit is configured to apply a ripple current of a predetermined frequency to the secondary battery. The strain gauge is configured to acquire strain of the secondary battery in association with the application of the ripple current of the predetermined frequency. The electronic control unit is configured to diagnose whether or not the secondary battery is a regular product. The electronic control unit is configured to diagnose whether or not the secondary battery is a regular product based on the strain of the secondary battery acquired by the strain gauge.

In the first aspect of the present disclosure, the electronic control unit may be configured to diagnose that the secondary battery is not a regular product when the strain of the secondary battery acquired by the strain gauge is out of a set range. The set range may include a magnitude of strain of the regular product at a time of the application of the ripple current of the predetermined frequency.

In the first aspect of the present disclosure, the ripple current circuit may be configured to apply ripple currents having different frequencies to the secondary battery, and the electronic control unit may be configured to calculate a strain inclination of the secondary battery with respect to each of the frequencies of the ripple currents based on the strain of the secondary battery acquired by the strain gauge, and diagnose that the secondary battery is not a regular product when the calculated strain inclination of the secondary battery is out of a set range that includes a strain inclination of the regular product.

According to the first aspect, whether or not the secondary battery is a regular product is diagnosed based on the strain of the secondary battery generated when the ripple current of the predetermined frequency is applied to the secondary battery, so that it is possible to diagnose whether or not the secondary battery is a regular product even when a regular product and a non-regular product are equal in weight.

In the first aspect of the present disclosure, the secondary battery may be an assembled battery formed by laminating single cells, each of the single cells may include an electrode body and a case for housing the electrode body, and the strain gauge may be configured to detect strain of the case of the single cell.

According to the first aspect, the strain of the case of the single cell is detected, so that it is possible to accurately detect the strain of the secondary battery generated when the ripple current of the predetermined frequency is applied to the secondary battery.

A diagnostic method for a secondary battery according to a second aspect of the present disclosure includes applying a ripple current of a predetermined frequency to the secondary battery, acquiring strain of the secondary battery in association with the application of the ripple current of the predetermined frequency, and diagnosing whether or not the secondary battery is a regular product based on the acquired strain of the secondary battery.

In the second aspect of the present disclosure, the diagnosing may include diagnosing that the secondary battery is not a regular product when the acquired strain of the secondary battery is out of a set range that includes a magnitude of strain of the regular product at a time of the application of the ripple current of the predetermined frequency.

In the second aspect of the present disclosure, the applying may include applying ripple currents having different frequencies to the secondary battery, the acquiring may include acquiring strain of the secondary battery for each applications of the ripple currents having the different frequencies, and the diagnosing may include calculating a strain inclination of the secondary battery with respect to the frequency of the ripple current based on the strain of the secondary battery acquired by the strain gauge, and diagnosing that the secondary battery is not a regular product when the calculated strain inclination of the secondary battery is out of a set range including a strain inclination of the regular product.

According to the second aspect, whether or not the secondary battery is a regular product is diagnosed based on the strain of the secondary battery generated when the ripple current of the predetermined frequency is applied to the secondary battery, so that it is possible to diagnose whether or not the secondary battery is a regular product even when a regular product and a non-regular product are equal in weight.

A vehicle according to a third aspect of the present disclosure includes a secondary battery and the diagnostic system for a secondary battery. External charging of the secondary battery may be enabled, the external charging being performed by using power supplied from an external power supply, and the electronic control unit of the diagnostic system may be configured to diagnose whether or not the secondary battery is a regular product when the external charging is performed.

According to the third aspect, when the secondary battery mounted in the vehicle is externally charged, the electronic control unit diagnoses whether or not the secondary battery is a regular product, so that it is possible to execute the diagnosis periodically, and to more reliably diagnose whether or not the secondary battery is a regular product.

A vehicle according to a fourth aspect of the present disclosure includes a secondary battery, the diagnostic system for a secondary battery, and a warning device configured to issue a warning when the electronic control unit of the diagnostic system diagnoses that the secondary battery is not a regular product.

According to the fourth aspect, it is possible to inform a user of the vehicle that a secondary battery of a non-regular product is mounted.

According to the aspects of the present disclosure, it is possible to diagnose whether or not the secondary battery is a regular product even when a regular product and a non-regular product are equal in weight.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. Note that, in the drawings, the same or equivalent parts are denoted by the same reference numerals, and description thereof will not be repeated.

In the following embodiment, a configuration in which a "diagnostic system for a secondary battery" according to the present disclosure is mounted in a vehicle will be described as an example. However, application of the "diagnostic system for a secondary battery" according to the present disclosure is not limited to the vehicle, and may be, for example, stationary application.

System Configuration

Figure 1:
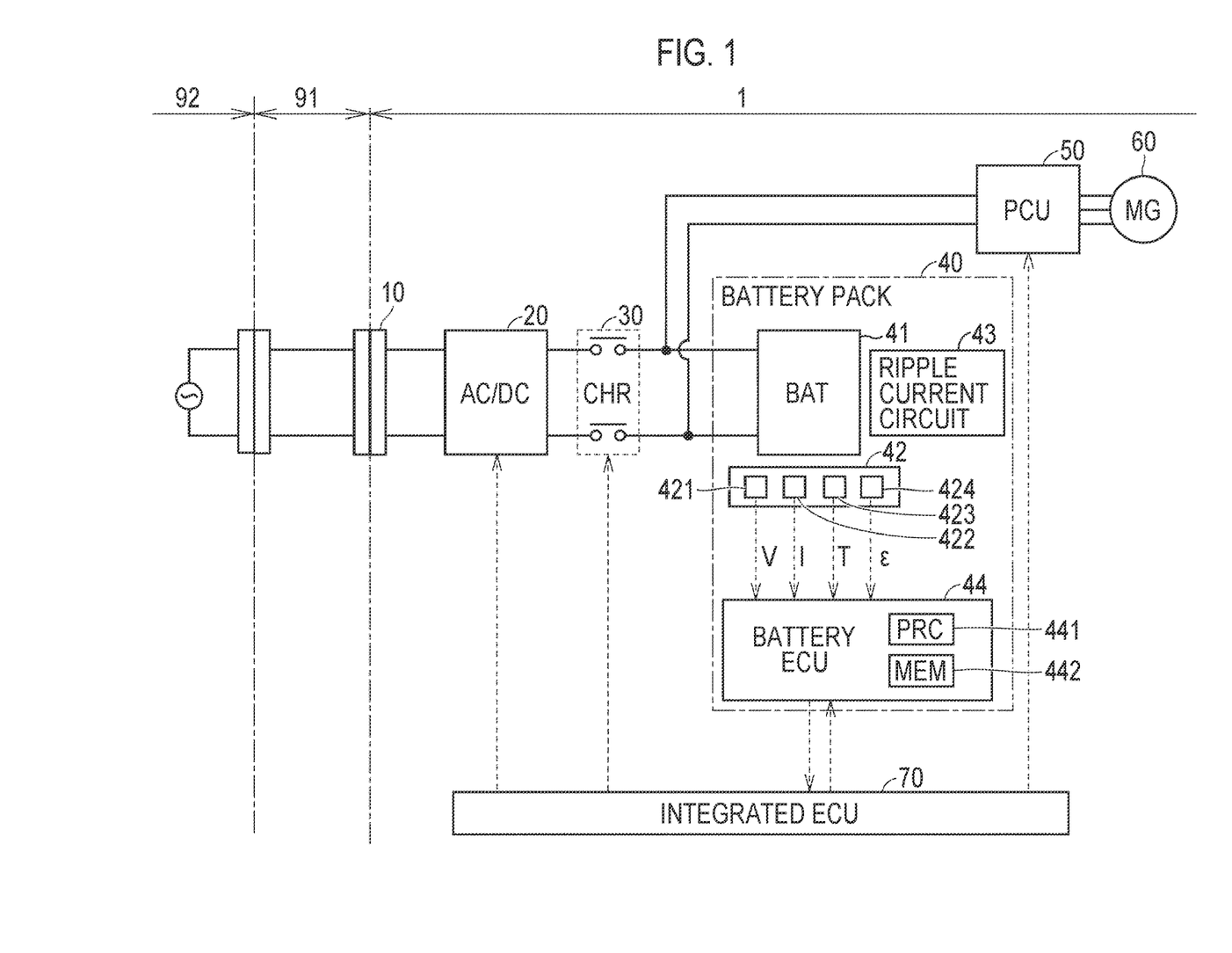
FIG. 1 is a diagram schematically showing an overall configuration of a vehicle mounted with a diagnostic system for a secondary battery according to the present embodiment.

FIG. 1 is a diagram schematically showing an overall configuration of the vehicle mounted with the diagnostic system for a secondary battery according to the present embodiment. A vehicle 1 is a battery electric vehicle (BEV) in the present embodiment. Note that a type of the vehicle 1 is not limited thereto insofar as a battery pack is mounted in the vehicle. The vehicle 1 may be a hybrid electric vehicle (HEV), a plug-in hybrid electric vehicle (PHEV), or a fuel cell electric vehicle (FCEV).

The vehicle 1 includes an inlet 10, an AC/DC converter 20, a charge relay (CHR) 30, a battery pack 40, a power control unit (PCU) 50, a motor generator (MG) 60, and an integrated electronic control unit (ECU) 70. The battery pack 40 includes an assembled battery 41, a monitoring unit 42, a ripple current circuit 43, and a battery ECU 44. The battery pack 40 is an example of the "diagnostic system for a secondary battery" according to the present disclosure.

The inlet 10 is configured such that a charging connector provided at a tip of a charging cable 91 can be inserted thereinto. The vehicle 1 and an external power supply (for example, a system power source) 92 installed outside the vehicle 1 are electrically connected via the charging cable 91. The vehicle 1 is configured to be capable of "external charging" in which the assembled battery 41 is charged using power supplied from the external power supply 92.

The AC/DC converter 20 is electrically connected between the inlet 10 and the charge relay 30. The AC/DC converter 20 converts alternating current power supplied from the external power supply 92 via the inlet 10 into direct current power, and outputs the direct current power to the charge relay 30. In addition, the AC/DC converter 20 converts direct current power supplied from the assembled battery 41 (or the PCU 50) via the charge relay 30 into alternating current power, and outputs the alternating current power to the inlet 10.

The charge relay 30 is electrically connected to a power line connecting the AC/DC converter 20 and the assembled battery 41. The charge relay 30 is opened or closed in response to a control signal from the integrated ECU 70.

The assembled battery 41 stores power for driving the motor generator 60, and supplies power to the motor generator 60 through the PCU 50. In addition, the assembled battery 41 is charged by the power output from the AC/DC converter 20 at the time of external charging. Further, the assembled battery 41 is charged by receiving generated power through the PCU 50 even when the motor generator 60 generates power (for example, at the time of regenerative power generation).

The monitoring unit 42 includes a voltage sensor 421, a current sensor 422, a temperature sensor 423, and a strain gauge 424. The voltage sensor 421 detects a voltage V of the assembled battery 41. The current sensor 422 detects a current I input and output to and from the assembled battery 41. The temperature sensor 423 detects a temperature TB of the assembled battery 41. The strain gauge 424 measures strain ε of the assembled battery 41. Each sensor outputs a signal indicating a result of the detection or a result of the measurement to the battery ECU 44.

The ripple current circuit 43 is configured to be capable of applying (superimposing) a ripple current (ripple current: pulsating current) to a charging-discharging current of the assembled battery 41. The ripple current circuit 43 may generate a ripple current by using charging-discharging power from the AC/DC converter 20 to the assembled battery 41, or may generate a ripple current using power supplied from another power source (for example, power supplied from an auxiliary battery (not shown)). In addition, the ripple current circuit 43 may generate a ripple current by using an electronic load connected to the assembled battery 41. A frequency of an alternating current signal generating portion of the ripple current circuit 43 can be changed in a range of 100 Hz to several kHz, for example, and the ripple current circuit 43 can apply a ripple current of 100 Hz to several kHz to the charging-discharging current of the assembled battery 41.

The battery ECU 44 includes a processor 441, such as a central processing unit (CPU), a memory 442, such as a read only memory (ROM) and a random access memory (RAM), and input/output ports (not shown) for inputting/outputting various signals.

The battery ECU 44 manages the assembled battery 41 in cooperation with the integrated ECU 70 based on input of a signal from each sensor of the monitoring unit 42 and a map and a program stored in the memory 442. As a main process executed by the battery ECU 44 in the present embodiment, there is a "diagnostic process" for diagnosing whether or not the assembled battery 41 is a regular product. The diagnostic process executed by the battery ECU 44 will be described below.

The PCU 50 includes, for example, an inverter and a converter (neither shown). The PCU 50 executes bidirectional power conversion between the assembled battery 41 and the motor generator 60 in response to the control signal from the integrated ECU 70.

The motor generator 60 is, for example, a three-phase alternating current rotary electric machine in which a permanent magnet is embedded in a rotor (not shown). The motor generator 60 rotates a drive shaft by using power supplied from the assembled battery 41. In addition, the motor generator 60 can generate power by regenerative braking. Alternating current power generated by the motor generator 60 is converted into direct current power by the PCU 50 to be used for charging the assembled battery 41.

Like the battery ECU 44, the integrated ECU 70 includes a processor, a memory, and input/output ports (none of which are shown). The integrated ECU 70 controls devices (AC/DC converter 20, charge relay 30, and PCU 50) such that the vehicle 1 is in a desired state, based on input of a signal from each sensor provided in the vehicle 1 and a map and a program stored in the memory. The integrated ECU 70 controls charging and discharging of the assembled battery 41 by, for example, controlling at least one of the AC/DC converter 20 or the PCU 50. The ECU mounted in the vehicle 1 may be appropriately integrated or may be divided for each function.

Structure of Assembled Battery

Figure 2:
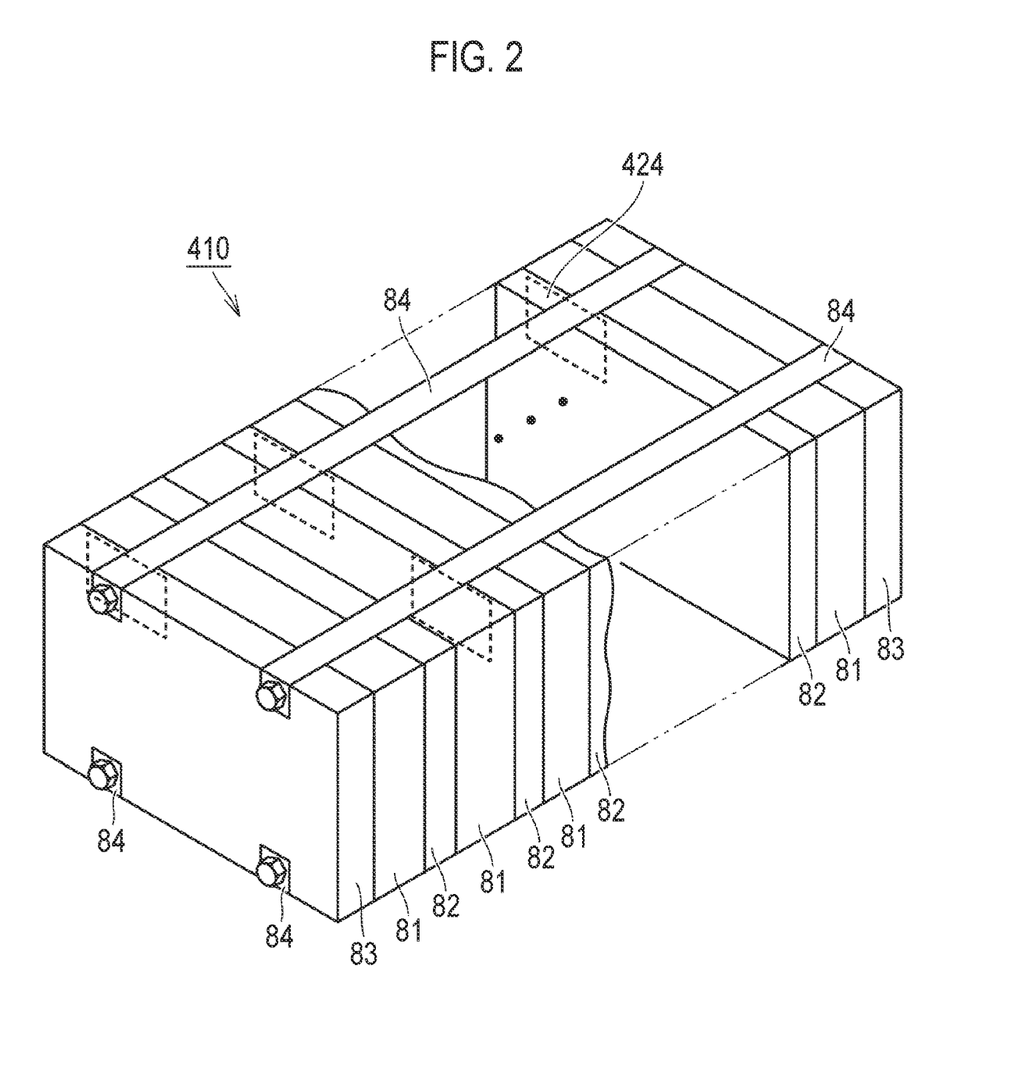
FIG. 2 is a perspective view schematically showing a structure of an assembled battery in the present embodiment.

FIG. 2 is a perspective view schematically showing a structure of the assembled battery 41 in the present embodiment. The assembled battery 41 includes a plurality of stacks 410 (also referred to as modules or blocks). The stacks 410 may be connected in series or in parallel with each other. FIG. 2 typically shows one of the stacks 410.

The stack 410 includes a plurality of cells (single cells) 81, a plurality of resin frames 82, a pair of end plates 83, and a pair of restraint bands 84. In the stack 410, the cells 81 and the resin frames 82 are laminated to form a laminate.

Each of the cells 81 is a secondary battery, such as a lithium ion battery or a nickel hydrogen battery. The number of the cells included in the stack 410 is not particularly limited. A configuration of each cell 81 is common, and the laminated cells 81 are electrically connected in series.

Each of the resin frames 82 is disposed between two cells 81 adjacent to each other in a laminating direction. The end plates 83 are disposed at a first end and a second end of the laminate in the laminating direction. The end plates 83 are disposed so as to sandwich the laminate from both sides in the laminating direction.

The restraint bands 84 are disposed on an upper surface and a lower surface of the resin frame 82. The restraint bands 84 mutually restrain the end plates 83 in a state where the laminate is sandwiched between the end plates 83.

Figure 3:
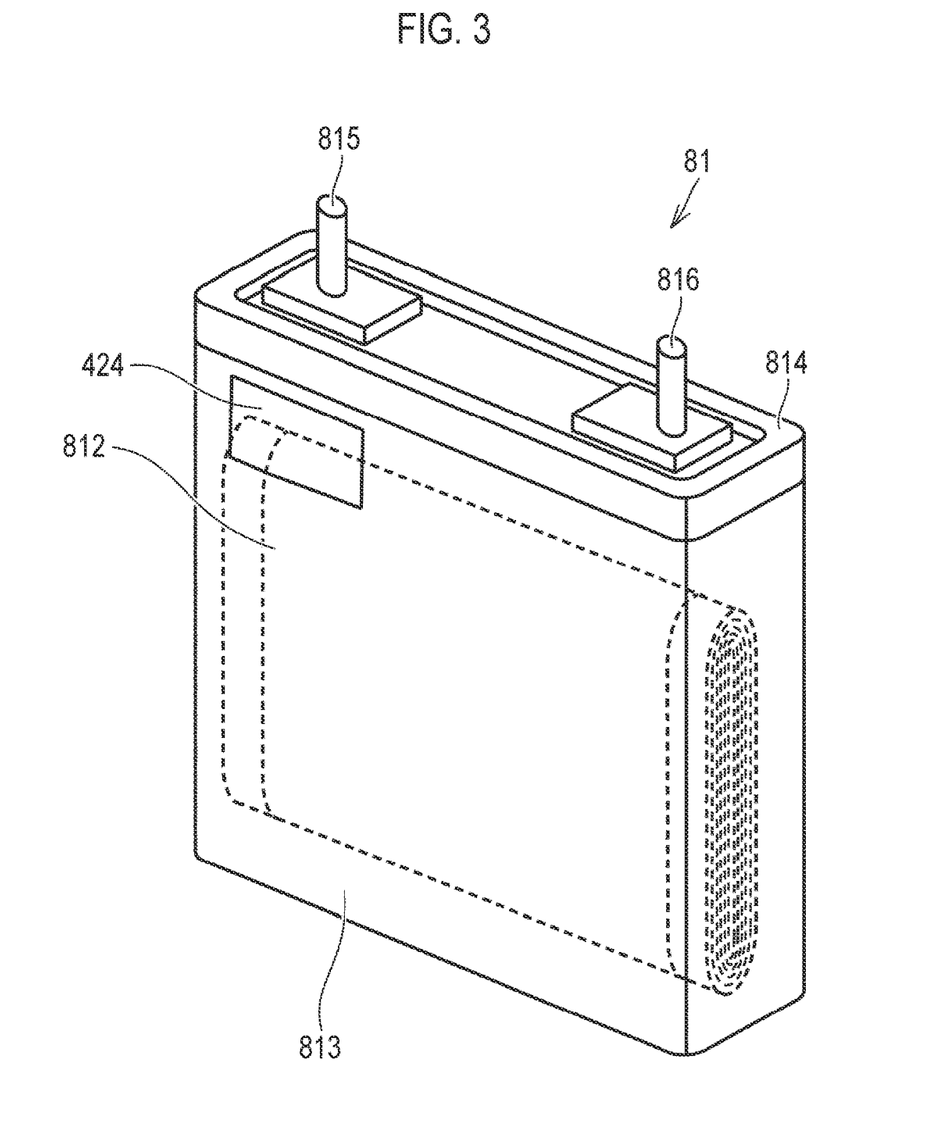
FIG. 3 is a perspective view showing an example of a configuration of a cell.

FIG. 3 is a perspective view showing an example of a configuration of the cell 81. In the example, the cell 81 is a lithium ion battery.

The cell (single cell) 81 is a square cell having a substantially rectangular cuboid shape. The cell 81 includes a case 813 for housing an electrode body 812 and a lid body 814 that seals an upper surface of the case 813. The lid body 814 is provided with a positive electrode terminal 815 and a negative electrode terminal 816. A first end of each of the positive electrode terminal 815 and the negative electrode terminal 816 protrudes outward from the lid body 814. Second ends of the positive electrode terminal 815 and the negative electrode terminal 816 are respectively electrically connected to an internal positive electrode terminal and an internal negative electrode terminal (neither shown) inside the case 813. Although not shown, two cells 81 adjacent to each other are electrically connected in series with each other by a bus bar.

The electrode body 812 is housed inside the case 813. The electrode body 812 is formed by, for example, laminating a positive electrode sheet and a negative electrode sheet via a separator and winding the laminated body into a cylindrical shape. An electrolyte is held in the positive electrode sheet, the negative electrode sheet, the separator, and the like. As the electrode body 812, a laminate can be used instead of the wound body.

The strain gauge 424 is attached to the case 813 of the cell 81. The strain gauge 424 may be a metal strain gauge or a semiconductor strain gauge. In the present embodiment, in order to detect strain caused by a change in thickness of the case 813 in the vicinity of the positive electrode terminal 815, the strain gauge 424 is attached to a lower side surface of the positive electrode terminal 815 by using an adhesive.

Application of Ripple Current

In the vehicle 1 configured as described above, the assembled battery 41 in the battery pack 40 deteriorates with use or with passage of time. When the deterioration of the assembled battery 41 has progressed to a considerable extent, it is considered that the assembled battery 41 is replaced with a new assembled battery (or a used assembled battery of which the deterioration has not progressed relatively). In this case, a non-regular assembled battery, such as a counterfeit product or a third-party product, may be selected.

It is also considered to diagnose whether or not the assembled battery 41 is a regular product based on a weight of the assembled battery 41, as in the description of JP 2012-174487 A. However, in that case, when the assembled battery is replaced with the assembled battery 41 having an equivalent weight but different characteristics (external shape or structure of cell, battery material, or the like) other than the weight, whether or not the assembled battery 41 is a regular product may not be appropriately diagnosed.

In the present embodiment, a configuration is adopted in which whether the assembled battery 41 is a regular product or a non-regular product is diagnosed based on strain generated when a ripple current of a predetermined frequency is applied to the assembled battery 41. The ripple current circuit 43 applies (superimposes) a ripple current to a charging-discharging current to the assembled battery 41 in accordance with a command from the battery ECU 44. Then, the thickness of the case 813 of the cell 81 changes, and strain occurs. The strain gauge 424 measures the strain. The battery ECU 44 (processor 441) diagnoses whether the assembled battery 41 is a regular product or a non-regular product based on strain $\varepsilon$ measured by the strain gauge 424.

Figure 4:
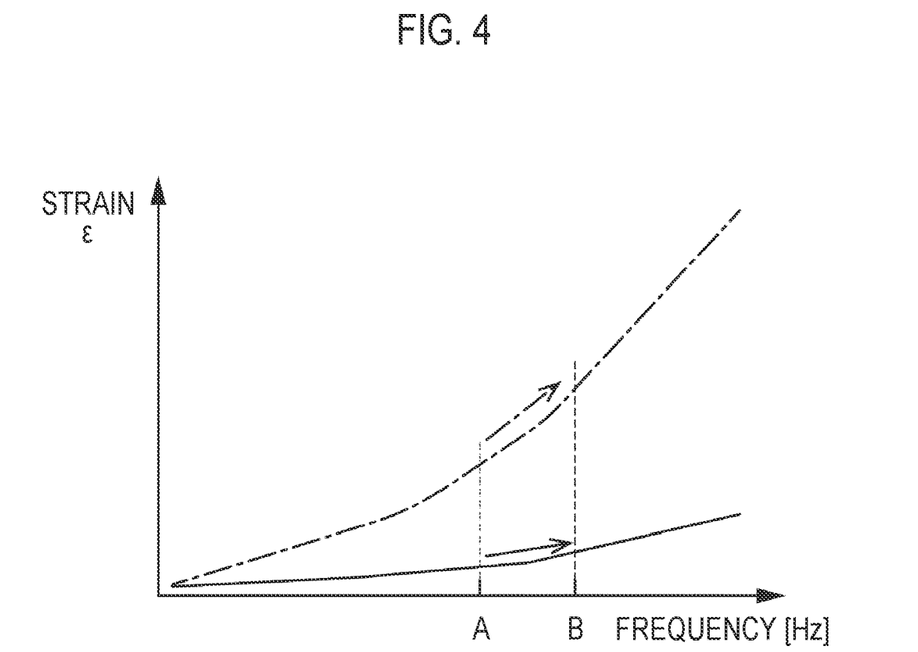
FIG. 4 is a graph describing generation of strain in association with application of a ripple current.

FIG. 4 is a graph describing the generation of the strain in association with the application of the ripple current. In FIG. 4, the horizontal axis represents a frequency (Hz) of the ripple current, and the vertical axis represents a magnitude of the strain generated in the case of the cell (single cell).

In FIG. 4, the solid line indicates a relationship between the frequency of the ripple current and the magnitude of the strain in the regular product. As shown in FIG. 4, in the regular product, the strain increases relatively moderately as the frequency of the ripple current increases.

In FIG. 4, the dot-and-dash line indicates a relationship between the frequency of the ripple current and the magnitude of the strain in the non-regular product, and, as the frequency of the ripple current increases, the strain sharply increases as compared with the regular product.

When a ripple current of a frequency A is applied to both the regular product and the non-regular product, the strain of the non-regular product becomes larger than the strain of the regular product in the example shown in FIG. 4. There is a significant difference between the two strain magnitudes.

When a ripple current of a frequency A is applied to both the regular product and the non-regular product and a ripple current of a frequency B higher than the frequency A is then applied thereto, the amount of strain increase in association with an increase in frequency of the ripple current (hereinafter, also referred to as "strain inclination $\theta$ with respect to frequency" or simply "strain inclination $\theta$") is larger in non-regular product than in regular product. In this way, there is a significant difference between the magnitudes of the strain inclination with respect to the frequency.

The above-mentioned phenomenon is because the relationship between the frequency of the ripple current and the strain changes depending on the material of the electrode body (positive electrode, negative electrode) of the cell (single cell) and the case structure. Therefore, the relationship between the regular product and the non-regular product is not limited to the example shown in FIG. 4, and the strain of the regular product may be larger than the strain of the non-regular product depending on the configuration of the cell (single cell).

Diagnostic Criteria

Figure 5A:
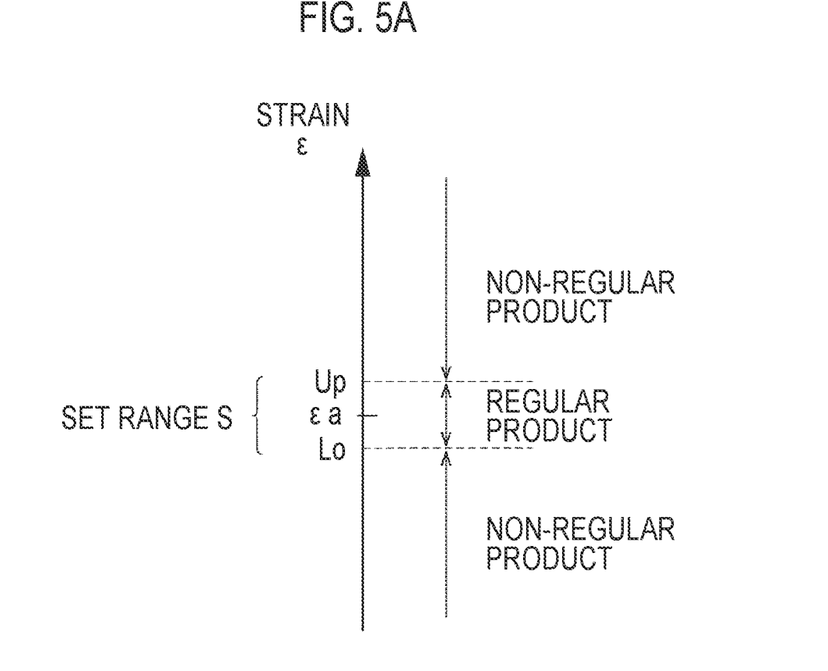
FIG. 5A is a graph for describing diagnostic criteria of a regular product in the present embodiment.
Figure 5B:
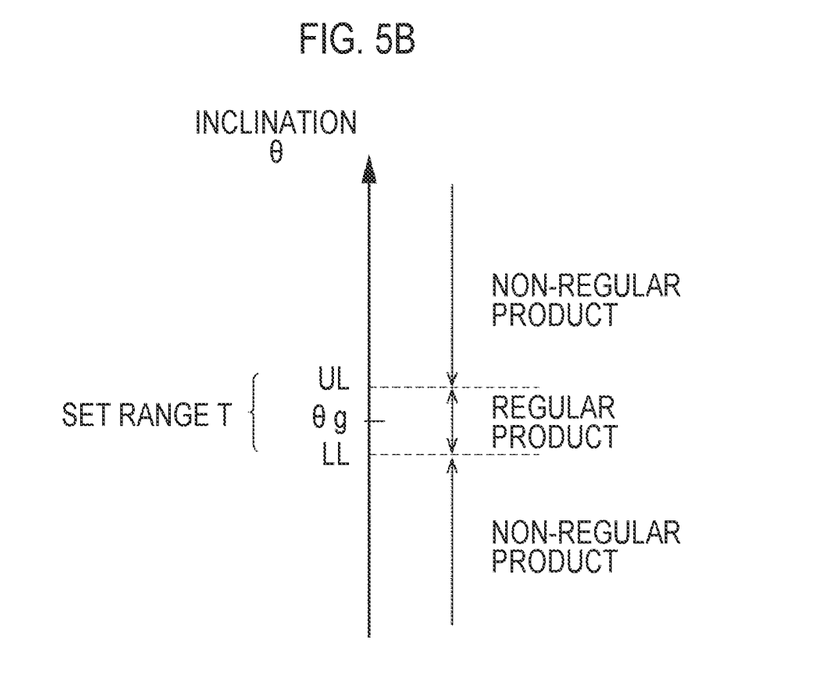
FIG. 5B is a graph for describing diagnostic criteria of a regular product in the present embodiment.

FIGS. 5A and 5B are graphs for describing diagnostic criteria of the regular product in the present embodiment.

FIG. 5A shows a diagnostic criterion for diagnosing whether or not the assembled battery 41 is a regular product by using the strain $\varepsilon$ measured by the strain gauge 424. Strain $\varepsilon a$ of the regular product when a ripple current of a frequency A is applied to the regular product is measured in advance, and a certain range including the strain $\varepsilon a$ is determined. Hereinafter, the range is also referred to as a "set range S". The upper limit value of the set range S is described as Up, and the lower limit value of the set range S is described as Lo (Up<$\varepsilon a$<Lo).

The strain $\varepsilon$ of the assembled battery to be diagnosed (target assembled battery) when the ripple current of the frequency A is applied to the target assembled battery is measured, and a result of the measurement is compared with the set range S. When the strain $\varepsilon$ is within the set range S, diagnosis can be made that the target assembled battery is a regular product. On the other hand, when the strain $\varepsilon$ is out of the set range S, diagnosis can be made that the target assembled battery is not a regular product (non-regular product).

FIG. 5B shows a diagnostic criterion for diagnosing whether or not the assembled battery 41 is a regular product by using the strain inclination $\theta$ with respect to the frequency. The ripple current of the frequency A is applied, and the strain ca at the frequency A is measured. Thereafter, a ripple current of a frequency B higher than the frequency A is applied to the regular product, and strain $\varepsilon b$ at the frequency B is measured. Then, strain inclination $\theta g(=(\varepsilon b-\varepsilon a)/(B-A))$ is calculated. In this way, the strain inclination $\theta g$ of the regular product is obtained in advance, and a certain range including the strain inclination $\theta g$ is determined. Hereinafter, the range is also referred to as a "set range T". The upper limit value of the set range T is described as UL, and the lower limit value of the set range T is described as LL (LL<$\theta g$<UL).

The ripple current of the frequency A is applied to the assembled battery to be diagnosed (target assembled battery), and then the ripple current of the frequency B is applied thereto, to calculate the strain inclination $\theta$ of the target assembled battery, and a result of the calculation is compared with the set range T. When the strain inclination $\theta$ is within the set range T, diagnosis can be made that the target assembled battery is a regular product. On the other hand, when the strain inclination $\theta$ is out of the set range T, diagnosis can be made that the target assembled battery is not a regular product (non-regular product).

In this way, the battery ECU 44 can diagnose whether the assembled battery 41 is a regular product or a non-regular product based on the strain $\varepsilon$ measured by the strain gauge 424.

Diagnostic Process

Figure 6:
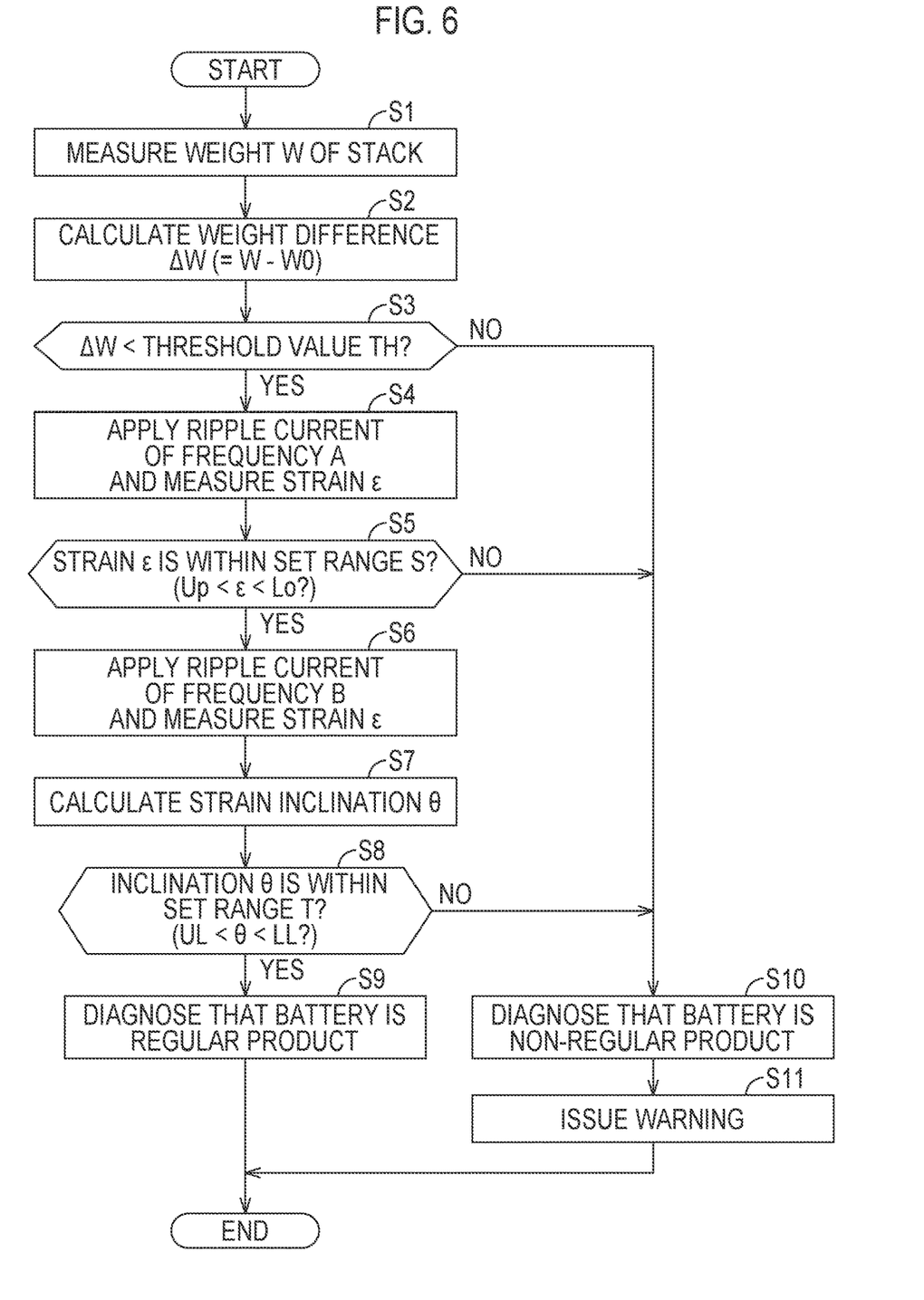
FIG. 6 is a flowchart showing a diagnostic process in the present embodiment.

FIG. 6 is a flowchart showing a diagnostic process in the present embodiment. The flowchart is executed when the assembled battery 41 (stack 410) is replaced. For example, when the assembled battery 41 is replaced, the flowchart may be executed together with an initialization process of the battery ECU 44. Each step is realized by software processing by the battery ECU 44, and may be realized by hardware (electric circuit) manufactured in the battery ECU 44. Hereinafter, each step is abbreviated as S.

In S1, the battery ECU 44 measures a weight W of the assembled battery by using a weight sensor (not shown). In the memory 442 of the battery ECU 44, a weight W0 of the assembled battery 41 (regular product) in the initial state (such as state at the time of shipment from facility) of the battery pack 40 is stored in a non-volatile manner. In the following S2, the battery ECU 44 calculates a weight difference ΔW (=W−W0) between the weight W measured in S1 and the weight W0 in the initial state. Then, the battery ECU 44 determines whether or not the weight difference ΔW is less than a predetermined threshold value TH (S3). When the weight difference ΔW is equal to or greater than the threshold value TH, a negative determination is made in S3, and the battery ECU 44 diagnoses that the target assembled battery is a non-regular product (S10). On the other hand, when the weight difference ΔW is less than the threshold value TH, an affirmative determination is made in S3, and the battery ECU 44 advances the process to S4. For details of the processes of S1 to S3, JP 2012-174487 A can be referred to.

In S4, the battery ECU 44 controls the ripple current circuit 43 to apply the ripple current of the frequency A to the charging-discharging current to the assembled battery 41 (target assembled battery). Then, after a predetermined time (for example, five minutes) has elapsed from the start of the application of the ripple current to the assembled battery 41, the battery ECU 44 measures the strain ε from an output signal (output voltage) of the strain gauge 424. For example, the strain ε is calculated and acquired from a difference between the output voltage of the strain gauge 424 before the ripple current is applied and the output voltage of the strain gauge 424 after a predetermined time has elapsed from the start of the application of the ripple current.

In the following S5, the battery ECU 44 determines whether or not the strain ε acquired in S4 is included in the set range S (range from upper limit value Up to lower limit value Lo). When the strain ε is within the set range S, an affirmative determination is made and the process proceeds to S6. When the strain ε is out of the set range S, a negative determination is made and the process proceeds to S10, where diagnosis is made that the target assembled battery is a non-regular product. The processes of S4 and S5 are executed for all the cells (single cells) 81 having the strain gauge 424, and, when an affirmative determination is made in S5 for all the cells 81, the process proceeds to S6. When a negative determination is made in S5 for any cell 81, the process proceeds to S10, where diagnosis is made that the target assembled battery is a non-regular product.

In S6, the battery ECU 44 controls the ripple current circuit 43 to apply the ripple current of the frequency B to the assembled battery 41 (target assembled battery). Then, after a predetermined time (for example, five minutes) has elapsed from the start of the application of the ripple current of the frequency B to the assembled battery 41, the battery ECU 44 measures the strain ε from an output signal (output voltage) of the strain gauge 424. For example, the strain ε is calculated and acquired from a difference between the output voltage of the strain gauge 424 before the ripple current of the frequency A is applied and the output voltage of the strain gauge 424 after a predetermined time has elapsed from the start of the application of the ripple current of the frequency B.

In the following S7, the strain inclination θ with respect to the frequency is calculated. For example, assuming that the strain ε acquired in S4 is εA and the strain ε acquired in S6 is εB, the strain inclination θ=(εB−εA)/(B−A) is calculated, and the process proceeds to S8.

In S8, the battery ECU 44 determines whether or not the strain inclination θ calculated in S7 is included in the set range T (range from upper limit value UL to lower limit value LL). When the strain inclination θ is within the set range T, an affirmative determination is made and the process proceeds to S9. When the strain inclination θ is out of the set range T, a negative determination is made and the process proceeds to S10, where diagnosis is made that the target assembled battery is a non-regular product. The processes of S6 and S7 are executed for all the cells (single cells) 81 having the strain gauge 424. For all the cells 81, when the strain inclination θ is within the set range T and an affirmative determination is made in S8, the process proceeds to S9. When a negative determination is made in S8 for any cell 81, the process proceeds to S10, where diagnosis is made that the target assembled battery is a non-regular product.

In S9, diagnosis is made that the target assembled battery is a regular product, and the process is ended. When the target assembled battery is diagnosed as a non-regular product in S10, the process proceeds to S11, where the battery ECU 44 displays a warning message on a human machine interface (HMI), such as an in-vehicle display, to issue a warning to a user (driver) of the vehicle 1, and then ends the process. A malfunction indication lamp (MIL) may be turned on and a diagnostic code (diagnosis code) indicating that the assembled battery 41 is a non-regular product may be written in the memory of the integrated ECU 70.

In the present embodiment, the strain of the assembled battery generated when a ripple current of a predetermined frequency (frequency A, frequency B) is applied to the assembled battery 41 is acquired by using the strain gauge 424, and whether or not the assembled battery 41 is a regular product is diagnosed based on the strain. Therefore, it is possible to appropriately diagnose whether or not the assembled battery 41 is a regular product even when a regular product and a non-regular product are equal in weight.

In the present embodiment, when the strain ε generated when the ripple current of the frequency A is applied to the assembled battery is within the set range S and the strain inclination θ with respect to the frequency is within the set range T, the assembled battery is diagnosed as a regular product. However, it may be possible to diagnose whether or not the assembled battery is a regular product by using either the strain ε or the strain inclination θ. For example, S6 to S8 in FIG. 6 may be omitted, and, when an affirmative determination is made in S5, the process may proceed to S9. Further, S5 may be omitted.

In the present embodiment, although the strain inclination θ is calculated from the strain ε generated when the ripple currents of the frequency A and the frequency B are applied, the strain inclination θ may be calculated by applying the ripple currents of three or more different frequencies to the assembled battery 41 and using the strain ε.

In the present embodiment, the strain gauge 424 is provided in all the cells (single cells) 81, and the strain of all the cells 81 is measured. However, the strain gauge 424 need not be provided in all the cells 81 constituting the assembled battery 41. Even in this case, when the assembled battery is replaced in units of the stack 410, it is possible to appropriately diagnose whether the assembled battery is a regular product or a non-regular product.

Modification Example

In the above embodiment, the diagnostic process of FIG. 6 is executed when the assembled battery 41 is replaced. In a modification example, the diagnostic process of FIG. 6 is executed each time the assembled battery 41 is externally charged. The battery ECU 44 executes the diagnostic process of FIG. 6 when, for example, the charging connector of the charging cable 91 is connected to the inlet 10, the charge relay 30 is closed, the operation of the AC/DC converter 20 is started, and external charging is started.

According to the modification example, since whether the assembled battery 41 is a regular product or a non-regular product is diagnosed each time the assembled battery 41 is externally charged, so that the diagnosis frequency increases, and the diagnosis can be performed more reliably.

The embodiment disclosed herein is merely illustrative and not restrictive in all respects. The scope of the present disclosure is defined by the terms of the claims, rather than the above description of the embodiment, and is intended to include any modifications within the scope and meaning equivalent to the terms of the claims.

What is claimed is:

1. A diagnostic system for a secondary battery, the diagnostic system comprising:
   a ripple current circuit configured to apply a ripple current of a predetermined frequency to the secondary battery;
   a strain gauge configured to acquire strain of the secondary battery in association with the application of the ripple current of the predetermined frequency; and
   an electronic control unit configured to diagnose whether or not the secondary battery is a regular product, the electronic control unit being configured to diagnose whether or not the secondary battery is a regular product based on the strain of the secondary battery acquired by the strain gauge.

2. The diagnostic system according to claim 1, wherein the electronic control unit is configured to diagnose that the secondary battery is not a regular product when the strain of the secondary battery acquired by the strain gauge is out of a set range,
   the set range includes a magnitude of strain of the regular product at a time of the application of the ripple current of the predetermined frequency.

3. The diagnostic system according to claim 1, wherein:
   the ripple current circuit is configured to apply ripple currents having different frequencies to the secondary battery; and
   the electronic control unit is configured to
      calculate a strain inclination of the secondary battery with respect to each of the frequencies of the ripple currents based on the strain of the secondary battery acquired by the strain gauge, and
      diagnose that the secondary battery is not a regular product when the calculated strain inclination of the secondary battery is out of a set range, the set range includes a strain inclination of the regular product.

4. The diagnostic system according to claim 1, wherein:
   the secondary battery is an assembled battery formed by laminating single cells;
   each of the single cells includes an electrode body and a case for housing the electrode body; and
   the strain gauge is configured to detect strain of the case of the single cell.

5. A diagnostic method for a secondary battery, the diagnostic method comprising:
   applying a ripple current of a predetermined frequency to the secondary battery;
   acquiring strain of the secondary battery in association with the application of the ripple current of the predetermined frequency; and
   diagnosing whether or not the secondary battery is a regular product based on the acquired strain of the secondary battery.

6. The diagnostic method according to claim 5, wherein the diagnosing includes diagnosing that the secondary battery is not a regular product when the acquired strain of the secondary battery is out of a set range,
   the set range includes a magnitude of strain of the regular product at a time of the application of the ripple current of the predetermined frequency.

7. The diagnostic method according to claim 5, wherein:
   the applying includes applying ripple currents having different frequencies to the secondary battery;
   the acquiring includes acquiring strain of the secondary battery for each applications of the ripple currents having the different frequencies; and
   the diagnosing includes
      calculating a strain inclination of the secondary battery with respect to the frequency of the ripple current based on the acquired strain of the secondary battery, and
      diagnosing that the secondary battery is not a regular product when the calculated strain inclination of the secondary battery is out of a set range including a strain inclination of the regular product.

8. A vehicle comprising:
   a secondary battery; and
   a diagnostic system for a secondary battery including
      a ripple current circuit configured to apply a ripple current of a predetermined frequency to the secondary battery,
      a strain gauge configured to acquire strain of the secondary battery in association with the application of the ripple current of the predetermined frequency, and
      an electronic control unit configured to diagnose whether or not the secondary battery is a regular product, the electronic control unit being configured to diagnose whether or not the secondary battery is a regular product based on the strain of the secondary battery acquired by the strain gauge,
   wherein external charging of the secondary battery is enabled, the external charging being performed by using power supplied from an external power supply; and
   the electronic control unit of the diagnostic system is configured to diagnose whether or not the secondary battery is a regular product when the external charging is performed.

9. A vehicle comprising:
   a secondary battery;
   a diagnostic system for a secondary including
      a ripple current circuit configured to apply a ripple current of a predetermined frequency to the secondary battery,
      a strain gauge configured to acquire strain of the secondary battery in association with the application of the ripple current of the predetermined frequency, and
      an electronic control unit configured to diagnose whether or not the secondary battery is a regular product, the electronic control unit being configured to diagnose whether or not the secondary battery is a regular product based on the strain of the secondary battery acquired by the strain gauge; and
   a warning device configured to issue a warning when the electronic control unit of the diagnostic system diagnoses that the secondary battery is not a regular product.

* * * * *